(12) United States Patent
Atkinson

(10) Patent No.: US 6,802,015 B2
(45) Date of Patent: Oct. 5, 2004

(54) METHOD FOR ACCELERATING THE SPEED OF A CPU USING A SYSTEM COMMAND HAVING AN OPERATION NOT ASSOCIATED WITH CHANGING THE SPEED OF THE CPU

(75) Inventor: Lee W. Atkinson, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 627 days.

(21) Appl. No.: 09/752,131

(22) Filed: Dec. 29, 2000

(65) Prior Publication Data

US 2002/0124197 A1 Sep. 5, 2002

(51) Int. Cl.⁷ .................................................. G06F 1/26
(52) U.S. Cl. ...................... 713/322; 713/300; 713/310; 713/320; 713/323; 713/324
(58) Field of Search ................................ 713/300, 310, 713/320, 322, 323, 324; 710/100

(56) References Cited

U.S. PATENT DOCUMENTS

| | | | |
|---|---|---|---|
| 5,774,701 A | * 6/1998 | Matsui et al. | 713/501 |
| 5,802,318 A | * 9/1998 | Murray et al. | 710/100 |
| 5,812,860 A | * 9/1998 | Horden et al. | 713/322 |
| 5,854,905 A | * 12/1998 | Garney | 713/2 |
| 6,081,901 A | * 6/2000 | Dewa et al. | 713/300 |
| 6,633,988 B2 | * 10/2003 | Watts et al. | 713/322 |

FOREIGN PATENT DOCUMENTS

JP          10161780 A   *  6/1998   ............ G06F/1/26

OTHER PUBLICATIONS

Ron White, "PC Computing: How Computers Work", 1994, Ziff–Davis Press, pp.: 112–113 and 130–131.*

* cited by examiner

Primary Examiner—A. Elamin
Assistant Examiner—James K. Trujillo

(57) ABSTRACT

A computer system supports operation of a CPU at multiple clock speeds. Logic in the computer system predicts the performance requirements of the CPU, and selects the fastest clock speed to optimize performance. In one embodiment, a Keyboard controller receives user inputs from various user input devices, including a mouse and keyboard. The Keyboard controller identifies user inputs that reflect a system command, such as, for example, a mouse click, selection of the Alt key with another key, or any special function keys associated with a software application. If such a user input is detected, the Keyboard controller generates a system management interrupt (SMI) to the CPU. In response, the CPU calls a speed control algorithm that identifies the source of the SMI and increases the clock speed to the processor by providing a control input to a multiplexer or switch that selects the highest clock speed for the CPU.

45 Claims, 2 Drawing Sheets

METHOD FOR ACCELERATING THE SPEED OF A CPU USING A SYSTEM COMMAND HAVING AN OPERATION NOT ASSOCIATED WITH CHANGING THE SPEED OF THE CPU

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to a computer system that includes a central processing unit that can operate at different frequencies. More particularly, the present invention relates to a portable computer system in which the speed of the central processing unit is accelerated in response to system command entries from a user.

2. Background of the Invention

Power management is an integral part of a battery-operated portable notebook computer. To maximize battery life, computer systems manage the power drain on the batteries by placing the computer system in a low power mode whenever possible. Typically, a computer system is placed in a low power mode when the computer system is inactive. The computer system is subsequently awoken in response to system activity, such as occurs when the user depresses any key on the keyboard or moves or presses a button on a mouse. See U.S. Pat. No. 5,218,704. Thus, any keystroke forms a break event that wakes the system from an idle mode.

Computer systems typically include input devices, such as a keyboard and a pointing device. The keyboard usually includes 101 alphanumeric, positioning, and function keys. A mouse or other pointing device includes some form of motion sensor, and 2 or 3 finger operated control buttons. The keyboard and pointing device connect electrically to a keyboard controller via a PS/2 bus, which is a four wire, synchronous bus. The keyboard controller typically comprises a microprocessor-based controller, such as the Intel 8042 or Intel 8051. When a key is pressed, logic inside the keyboard issues a "make code" signal to the keyboard controller. A "break code" is issued when the key is lifted. Multiple keys may be pressed, especially in combination with a "shift", "Ctrl", "Alt", or "function" key. The keyboard controller identifies the "make" code and translates it to a "scan code" that is used by the operating system and application software. A mouse periodically issues a three byte packet of information. The first byte identifies if a button is pressed, and if so, which byte is pressed. The second and third bytes identify the displacement of the mouse along the X and Y axis that has occurred since the last mouse packet was sent, usually in two's complement format.

After a key press on the keyboard or mouse, or after a mouse movement, the keyboard controller generates a standard interrupt signal to the core chipset. Typically an IRQ1 is transmitted in response to a keyboard event, and IRQ12 is transmitted in response to a mouse event. The system BIOS responds to the keyboard interrupt (IRQ1), and assembles the scan codes for the operating system software to use. The mouse interrupts (IRQ12) are transmitted directly to the operating system software driver. In the Microsoft Windows Operating System, an input device driver examines the scan code and mouse data. The operating system will either message data as virtual scan codes to the application software, or will use the input data for its direct system commands.

The core chipset may include some limited power management functionality that permits the system to be placed in a low power state when the system is inactive. The system typically monitors inputs from the keyboard or mouse to determine when the system should break from the low power mode. The problem, however, is that placing the computer in a low power mode inevitably compromises system performance. A system in a low power state is not immediately responsive to user demands, and thus a user experiences some period of latency as the computer resumes its normal operational state. As the latency period becomes longer, it becomes increasingly irritating to the user.

Developing a power management system that is instantly and accurately responsive to user demands is problematic. There are two general techniques that have been used and discussed over the years for managing power in a portable computer. The first technique involves the manipulation of the operating frequency of the CPU and/or chipset. In particular, the system clock speeds are lowered to save power during periods when the system is perceived to be idle. See U.S. Pat. Nos. 5,625,826 and 5,504,908.

The manipulation of clock frequency for power management fell out of favor with the advent of techniques that completely halted the CPU by stopping the CPU clock. One technique that gained acceptance was to have the South bridge device generate a Stopclock signal to the CPU that caused the system to turn off the CPU clock, thereby placing the CPU in a suspended state. The Stopclock signal was generated in response to some event, or some indication that the system was inactive. A variation of the Stopclock technique permitted the system to resume normal operation for a fixed period to respond to a particular system event, followed by returning to the idle mode. This was commonly referred to as a Burst event. Another technique that was developed was halting the CPU in response to a software Autohalt command. The Autohalt technique required support of the application or operating system, which was supposed to report when it had finished a routine, and then instruct the CPU to go into a low power state. While both Stopclock and Autohalt have relatively minimal latency periods, they are not the most efficient techniques to control the CPU frequency, because the CPU must either be started or stopped, and cannot be throttled to slower or faster speeds. The ability to throttle the CPU to slower speeds also has the advantage of being able to lower the voltage to the CPU, while the CPU remains operational, albeit at a lower speed. Also, the Stopclock technique generally does not impact the amount of power drawn by the chipset.

Because of these limitations, power management in current portable computers has returned to the use of frequency manipulation to conserve battery power. Most CPU manufacturers now offer a frequency manipulation technique as part of current processors. For example, Intel has a technology that it markets as "Speedstep®" that enables the processor to operate at different clock speeds. Similarly, AMD has the "PowerNow!®" technology that also implements frequency manipulation of the CPU clock speed. Likewise, Transmeta® has the "LongRun®" technology that also performs frequency manipulation. Each of these techniques relies on lowering the CPU core frequency and/or chipset in response to either a system power state, a manual setting by the user, or the actual usage of the system.

As an example, the PowerNow! Technique from AMD senses the system idle time by looking at the excess capacity of the CPU. Thus, for example, if the CPU is idle greater than 20% of the time, the system can automatically lower the system clocks to 80% of their maximum clock frequency (i.e., from 600 MHz to 500 MHz. This enables the system to continue operating, but draw less power. In addition, frequency control circuitry for most manufacturers also typically includes a voltage control circuit that selects a lower CPU operating voltage level when the slower speed operating frequency is used.

Although these frequency manipulation techniques have improved the efficiency of the CPU in portable computer systems, the decision regarding when to change frequency still is archaic. Almost all systems are reactive, and thus wait to change speed until after the speed change is required. Very few (if any) systems exist that attempt to predict the performance requirement of the CPU, so as to modify the CPU clock speed at the very time that the change in speed is needed. Instead, the most advanced technique looks at an average of system idle times to determine what the current speed setting should be for the CPU. Such as system cannot efficiently match peak demands of a computer system.

One implementation suggested by the assignee of the present invention in U.S. Pat. No. 5,625,826 is to monitor the CPU memory activity to predict the frequency at which the system should operate. An absence of CPU reads from system memory was interpreted as indicating that the computer system was in a wait state, and could be slowed down. While this technique has merit in certain conditions, it is not entirely accurate in predicting the work level of the CPU. The problem with power management systems that monitor CPU inactivity is that there is an inherent latency both in detecting the requirement for higher CPU performance, and reacting to this requirement. Because almost all power management systems operate by lowering the speed of the computer system, the instantaneous performance is inherently slowed. The performance of instantaneous tasks, such as loading a file, performing a search, or refreshing a screen, are the commands that the user notices most acutely.

It would be advantageous if a power management technique could be developed that could predict the need for increased performance from the CPU. It would also be advantageous if a power management system was capable of examining requested transactions to aid in predicting CPU usage earlier in time to minimize latency. Most, if not all, current computer systems treat all user inputs equally. The only power management response that typically occurs in response to a user input is that the system will wake-up the CPU if the clocks are stopped to the CPU, to permit the CPU to process the requests. Thus, most power management systems use a user input as a break event, and do not attempt to identify the type of input for power management purposes.

BRIEF SUMMARY OF THE INVENTION

The present invention solves the deficiencies of the prior art by implementing a power management system for controlling the speed of the CPU and/or chipset based on user inputs. According to the preferred embodiment, the system monitors user inputs, and distinguishes between the types of user input. In particular, any user input that indicates a system command is identified, and in response, the CPU is accelerated to a higher clock frequency. In particular, a mouse click, pressing the "alt" key in combination with another key, or pressing the "Enter" key or the "Page Up" or "Page Down" key, selection of a special function key, and other predetermined keystrokes and keystroke combinations are used to denote a system command that will require increased processor capacity. Thus, the system detects these type of user inputs, and in response, accelerates the CPU frequency. Conversely, the system preferably responds to a simple data input from the user by maintaining the low power operation.

The system command inputs may be distinguished in several ways. One possibility is to have the operating system driver distinguish system commands from data entry operations. Upon detecting a system command, the operating system driver directs the power management software to accelerate to the highest CPU speed. Another possibility is that the keyboard controller may be configured to discriminate system command keystrokes, or a combination of keystrokes, from data keystrokes by comparing user inputs to a list of system commands. Upon detecting a system command, the keyboard controller generates an interrupt to the CPU. Yet another possibility for identifying system commands is to have the system BIOS read scan codes from the keyboard, and identify system commands.

According to one exemplary embodiment, the keyboard controller or other logic monitors user inputs and distinguishes between data inputs and system command inputs. In response to a system command input, the controller generates an interrupt to the core chipset, and also generates a System Management interrupt (SMI). The SMI activates a power management speed control algorithm, which provides a control input to a frequency multiplexer that selects a higher clock frequency for the CPU. Consequently, in response to the system command input from the user, the CPU clock speed is accelerated almost instantly. After a predetermined time period, the power management algorithm may return the clock frequency to a lower speed.

According to another exemplary embodiment, a software driver reads the input device and translates user input signals into an equivalent scan code. The translated scan code is then messaged to the application currently in focus. The Operating system input device driver software compares the keyboard or mouse data against a list of keystrokes that indicate the necessity of keyboard acceleration. If a match occurs, the Operating system will direct the power management driver to increase the speed of the CPU.

In another exemplary embodiment, the system BIOS may examine user input scan codes when they are read in response to an interrupt request, or when the scan codes are retrieved in response to an interrupt request. The scan codes may be compared to a list of keystrokes that have been identified as system commands. If a match occurs, the power management software driver is directed to increase CPU speed.

These and other aspects of the present invention will become apparent upon analyzing the drawings, detailed description and claims, which follow.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections. To the extent that any term is not specially defined in this specification, the intent is that the term is to be given its plain and ordinary meaning.

DETAILED DESCRIPTION OF THE PREFERRED EMBODIMENTS

Figure 1:
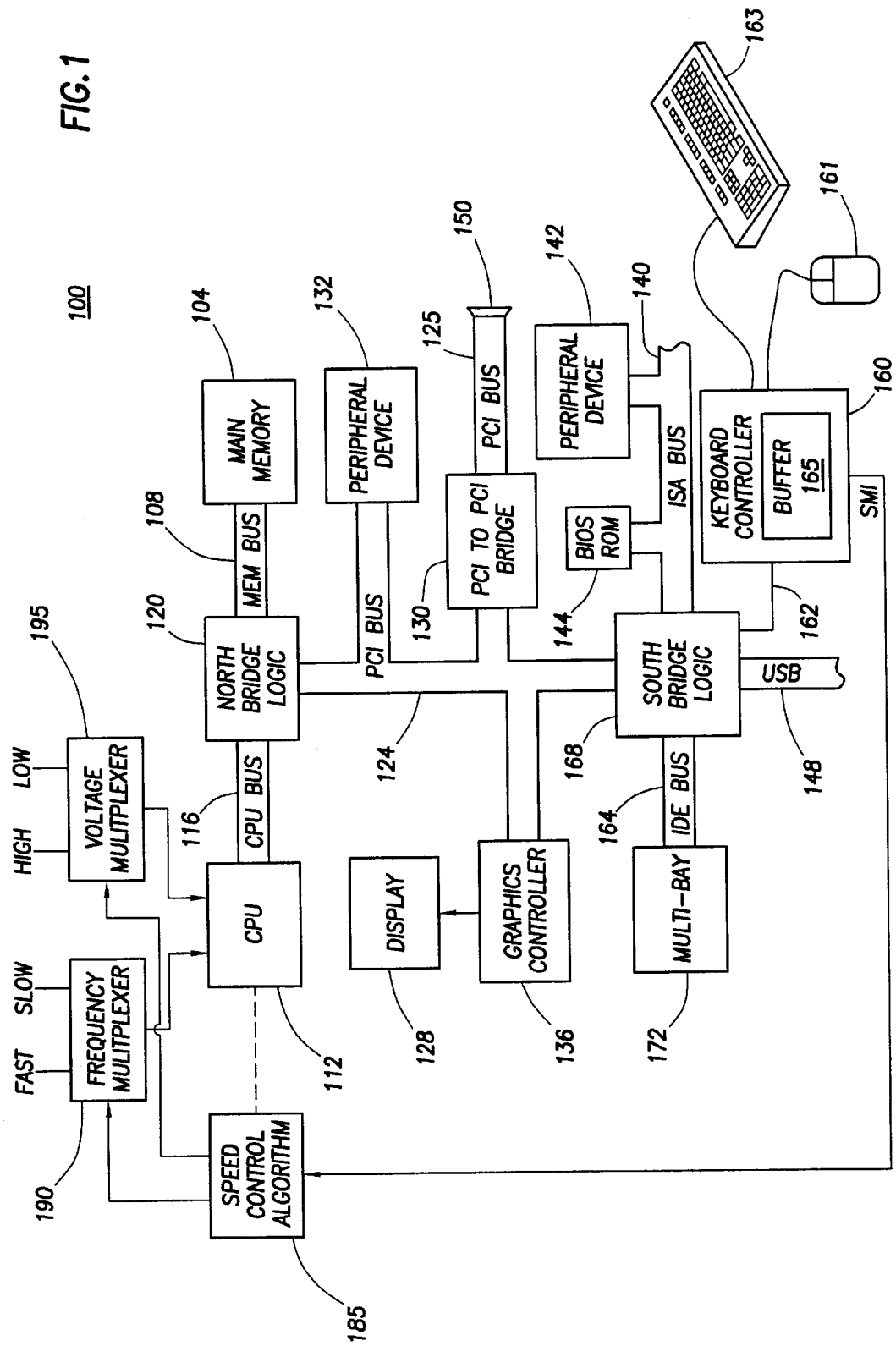
FIG. 1 is a block diagram illustrating an exemplary computer system constructed according to the preferred embodiment.

FIG. 1 illustrates a laptop computer system 100 constructed in accordance with a preferred embodiment. The following discussion, however, should not be construed as limiting the present invention to a laptop. The present invention also may be used with a desktop system, workstation, server, handheld computer, or any other battery operated electronic computing device, such as a cellular telephone, or any device where it is advantageous to conserve power. The following discussion describes an exemplary computer system that may be used with the principles of the present invention. It should be understood, however, that the computer system architecture is arbitrary, and any architecture may be used that supports input signals from a user, whether by keyboard, mouse, trackball, voice, visual, or any other technique that is currently available or which may become available in the future.

According to the exemplary embodiment of FIG. 1, computer system 100 generally comprises a microprocessor or CPU 112 coupled to a main memory array 104 and a variety of other peripheral computer system components through an integrated bridge logic device 120. The bridge logic device 120 is sometimes referred to as a "North bridge". The CPU 112 preferably couples to bridge logic 120 via a CPU bus 116, or the bridge logic 120 may be integrated into the CPU 112. The CPU 112 may comprise, for example, a Pentium II®, Pentium III®, or Celeron® processor by Intel®, the Athlon® processor by AMD, the Alpha® processor by Compaq, microprocessor. It should be understood, however, that computer system 100 could include other alternative types of microprocessors from a variety of manufacturers, or may be designed with multiple processors.

The main memory array 104 preferably couples to the bridge logic unit 120 through a memory bus 108, and the bridge logic 120 preferably includes a memory control unit (not separately depicted) that controls transactions to the main memory 104 by asserting the necessary control signals during memory accesses. The main memory 104 functions as the working memory for the CPU 112 and generally includes a conventional memory device or array of memory devices in which program instructions and data are stored. The main memory array may comprise any suitable type of memory such as dynamic random access memory (DRAM) or any of the various types of DRAM devices such as synchronous DRAM (SDRAM), extended data output DRAM (EDO DRAM), double data rate DRAM (DDR DRAM) or Rambus™ DRAM (RDRAM).

The computer system 100 also preferably includes a graphics controller 136 that couples to the bridge logic 120 via an expansion bus 124. As shown in FIG. 1, the expansion bus 124 comprises a Peripheral Component Interconnect (PCI) bus. Alternatively, the graphics controller 136 may couple to bridge logic 120 through an additional Advanced Graphics Port (AGP) bus (not specifically shown). As one skilled in the art will understand, the graphics controller 136 controls the rendering of text and images on a display device 128. In the preferred embodiment as shown in FIG. 1, the expansion bus 124 comprises a Peripheral Component Interconnect (PCI) bus. Computer system 100, however, is not limited to any particular type of expansion bus, and thus various buses may be used, including a high speed (100 MHz or faster) PCI bus. In the preferred embodiment, any number of PCI peripheral devices 132 may reside on the PCI bus 124, including devices such as, for example, network interface cards (NICs), video accelerators, audio cards, hard or floppy disk drives, Personal Computer Memory Card International Association (PCMCIA) drives, Small Computer Systems Interface (SCSI) adapters and telephony cards.

In addition and as mentioned above, computer system 100 can be implemented with respect to the particular bus architectures shown in FIG. 1 (i.e., PCI bus), or other bus architectures (i.e., IEEE 1394), as desired. Further, because CPU 112 preferably comprises a Pentium® III processor, the CPU bus 116 represents a Pentium® III bus. These bus protocols and the terminology used with respect to these protocols are well known to those of ordinary skill in the art. For a more thorough understanding of the PCI bus, refer to the *PCI Local Bus Specification* (1993). If an AGP bus also is used in the computer system, reference may be made to the *Accelerated Graphics Port Interface Specification* (Intel, 1996).

The computer system also includes a bus bridge 130 for coupling the expansion bus within the computer to a compatible expansion bus housed in a docking station, for example. The bus bridge 130 couples to a secondary PCI bus 125, which terminates at a docking connector 150. Because the buses 124 and 125 preferably represent PCI buses, the bus bridge 130 represents a PCI-to-PCI bus bridge.

Referring still to FIG. 1, a secondary bridge logic device 168 preferably connects to expansion bus 124. The secondary bridge logic is sometimes referred to as a "South bridge," reflecting its location vis-à-vis the North bridge in a typical computer system drawing. The South bridge 168 couples or "bridges" the primary expansion bus 124 to other secondary expansion buses. These other secondary expansion buses may include an ISA (Industry Standard Architecture) bus, a sub-ISA bus, a USB (Universal Serial Bus), an IDE bus, an IEEE 1394 standard (or "FireWire") bus, or any of a variety of other buses that are available or may become available in the future. In the preferred embodiment of FIG. 1, the South bridge logic 168 couples to a sub-ISA bus 140, a USB bus 148, and an IDE bus 164. As will be apparent to one skilled in this art, various peripheral devices may be coupled to each of these buses. Thus, as shown in the preferred embodiment of FIG. 1, a Keyboard controller chip 160 connects to the sub-ISA bus 140, as do a BIOS ROM 144 and various other ISA-compatible devices 142. According to the preferred embodiment, the South bridge may generate a Stopclock interrupt (not shown) to the CPU 112, requesting the CPU to stop operation based on a particular system event, or based on a user command.

As will be understood by one skilled in the art, the Keyboard controller 160 preferably includes a keyboard controller and associated logic for interfacing with the busses and other devices connected thereto. The Keyboard controller 160 preferably interfaces various input devices, including a mouse 161, a keyboard 163, a floppy disk drive, and various input switches such as a power switch and a suspend switch. A low speed serial bus 160, which generally is a bus with only one data signal, may provide an additional connection between the Keyboard controller 160 and South bridge 168. The Keyboard controller typically comprises an ISA bus interface (not specifically shown) and transmit and receive registers (not specifically shown) for exchanging data with the South bridge 168 over the serial bus. The Keyboard controller is responsible for receiving user commands from the various input/output devices, such as mouse 161 and keyboard 163, and for formatting and relaying these inputs to the South bridge, where the signals are formatted and transferred to appropriate devices in the computer system 100, such as the CPU 112. Typically, software applications running on the CPU receive the data relayed from the input devices, and execute routines to process that data, in accordance with known techniques.

The Keyboard controller 160 generally has the capability to handle power management functions such as reducing or terminating power to components such as the floppy drive (not shown), blocking the clock signals that drive components such as the bridge devices and CPU 112, and initiating sleep mode in the peripheral buses. The Keyboard controller 160 further asserts System Management Interrupt (SMI) signals to various devices such as the CPU 112, North bridge 120, and South bridge 168 to indicate special conditions pertaining to input/output activities such as sleep mode. The Keyboard controller 160 typically incorporates a counter or a Real Time Clock (RTC) to track the activities of certain components such as the hard drive and the PCI bus 125, and may induce a sleep mode or reduced power mode after a predetermined time of inactivity. The Keyboard controller may also place the computer system into a low-power mode, in which the power to all devices except the Keyboard controller 160 itself shuts off completely. Although the Keyboard controller 160 initiates many of the power functions, the Keyboard controller 160 typically acts according to instructions from the South bridge logic 168.

In accordance with the preferred embodiment of the present invention, the Keyboard controller examines the input signals received from the input devices, including the mouse 161 and keyboard 163. Logic in the Keyboard controller preferably distinguishes particular input signals for power management control purposes. In particular, the Keyboard controller identifies input signals that reflect a system command to the computer system. Thus, input signals reflecting that one of the mouse buttons has been depressed is interpreted by the Keyboard controller as indicating a command sequence. Similarly, depressing a special function key, an "Alt" key, a "Ctrl" key, a "Page up" or "Page down" key, or an "Enter" key is interpreted by Keyboard controller as indicating a command has been issued by the user. In response to the detection of one of these or other command inputs from the input devices 161, 163, the Keyboard controller transmits a system management interrupt (SMI) to a speed control algorithm 185 preferably stored in the BIOS ROM 144 that executes on the CPU 112 or on another programmable device in the computer system. In addition, the Keyboard controller 160 assembles the input signals from the input devices, and relays these signals to the South bridge 168 in accordance with normal convention by issuing a interrupt signal indicating input data has been received at the Keyboard controller 160.

More specifically, and in accordance with the preferred embodiment, the keyboard and mouse (or other pointing device) connect electrically to the Keyboard controller 160 via a PS/2 bus, which is a four wire synchronous bus. When a key is depressed on keyboard 163, logic inside the keyboard issues a "make code" signal to the keyboard controller 160. The keyboard logic also issues a "break code" signal when the key is lifted. Multiple keys may be pressed substantially simultaneously, especially in combination with the "shift", "Ctrl", "Alt", or "function" keys. The Keyboard controller 160 identifies the "make code" and translates it to a scan code that is used by the operating system and application software.

The mouse periodically issues a three-byte packet of information. The first byte of the mouse packet identifies if a button has been pressed, and if so, which button has been depressed. The second and third bytes identify the displacement of the mouse along the X and Y axis since the last mouse packet was sent. The Keyboard controller 160 generates a standard interrupt request to the CPU. Thus, in the case of a keyboard event, the Keyboard controller 160 transmits an IRQ1 to the CPU, and, in response to a mouse event, the Keyboard controller 160 transmits an IRQ12.

According to one exemplary embodiment, the Keyboard controller 160 also examines the keyboard and mouse packets to determine if the user is signaling a command by pressing a system command key or combination of keys. If the event is a keystroke, the Keyboard controller 160 compares the keyboard "make code" signal with a subset of possible make codes that are held in the local memory of the Keyboard controller 160. According to this embodiment, the Keyboard controller 160 compares the "make code" signal against a list of preset acceleration values that reflect system command inputs:

Keyboard System Command Identification Table

| Keyboard Input System Command Identification Table | |
|---|---|
| Examples of an Acceleration Input Key | Scan Code (hex value) |
| CTRL | 14 |
| Page Up | 7D |
| Page down | 7A |
| Alt | 11 |
| Enter | 5A |
| Left Windows key | DBE0 |

If, conversely, the information is a mouse packet, the Keyboard controller will test bits 0–2 of byte 1 of the packet, which identify if one of the mouse buttons has been pressed. In particular, bit 0 represents the left mouse button, bit 1 indicates the right mouse button, and bit 2 indicates the middle mouse button. Setting any of these bits to a logical "1" indicates that the associated mouse button has been depressed. According to this embodiment, the keyboard controller accepts a "double-click" of any of the mouse buttons as a system command. A double click is determined by observing the mouse button (bits 0–2 of mouse packet byte 1) transition high, then low, then high within 500 milliseconds. Conventional Keyboard controllers do not typically distinguish double-clicks, so either the Keyboard controller must be modified, or the Operating System monitors this transition to detect the double-click of a mouse button.

If the "make code" is listed in the System Command Identification table in the Keyboard controller 160, or if a mouse button has been double-clicked, the Keyboard controller 160 will assert its SMI source to the CPU. Conversely, if the make code represents another key is pressed (for example, the scan code is "33h" signifying that the "h" key is pressed), or if the mouse packet indicated X/Y movement, or a single button press, then no SMI will be generated and the CPU will stay in its most efficient power mode (low speed CPU frequency) state.

As an alternative to the hardware implementation described above in relation to FIG. 1, the present invention may also be implemented using software techniques. Thus, according to this embodiment, the discrimination of user inputs occurs at the software level, instead of at the Keyboard controller. In particular, the system software or BIOS may be used to detect system command acceleration keystrokes, instead of having the Keyboard controller 160 identify system commands and generate an SMI to the CPU.

Software discrimination of system commands from keystroke characters has certain advantages. One advantage of distinguishing system command keystrokes in software is that specific keystrokes may be dynamically enabled as system commands. While, the Microsoft Windows Operating system supports simultaneous multitasking operation of several applications, the operating system can only focus on a single program at any given time. Thus, the operation of the user input devices only applies to the program that is in the active window. Accurately predicting the requirement for increased processor performance relies, at least in part, on the correct association of the user inputs to the requirements of the active program. For example, a mouse click in the middle of a text document may not suggest the need for increased performance because the user may only be positioning the cursor for subsequent data entry on the keyboard. Conversely, a mouse click on a Command bar would suggest a task requiring significant performance demands. As another example, pressing the key for the letter "f" when working in a text file may simply denote a data entry. If, however, the letter "f" is depressed while a "Find" dialog frame is active may initiate a CPU-intensive process, demanding increased CPU performance.

A second advantage to software discrimination is that the operating system may reassign any input key for any function. Thus, the mouse buttons may be reassigned for a left or right-handed user. Similarly, a 101-key keyboard may have different conventions for different languages. While the hardware implementation can also support reassignment of the keys, a delay typically would be encountered while the new key assignments are downloaded from the operating system to the keyboard controller.

A third advantage to using software to discriminate system commands is that a broader set of input devices may be recognized as system command inputs. In particular, software recognition of system command input signals enables the use of USB peripheral input devices, without requiring a keyboard controller to interpret make codes and predict acceleration.

The system software can dynamically set the appropriate acceleration keystrokes. The Operating system will give the focus to the application program that is enabled for the keyboard or mouse. In the case of the mouse, the focus may move very quickly from one software application to another, as the mouse points to different application windows. The Operating system will give the mouse focus to the client area window which it instantaneously overlays. According to one embodiment, the active application program will message to the Operating system with a list of keystrokes (or comparison table) that indicate the necessity for CPU acceleration. Messaging is the method that the Operating system and Windows application software use to communicate common system information. The communication is typically accomplished through a polling operation.

The Operating system manages common resources to the application programs. The input devices are common hardware resources whose information will be interpreted by the Operating system before any data is provided to the application. An Operating system software routine will be initiated every time the keyboard or mouse is actuated. For the example, if the keyboard is connected to the system bus through a USB connection, the software driver will read the input device and translate the USB data stream into an equivalent scan code. The Operating system input device software will compare the keyboard or mouse data against the list of keystrokes that indicate the need for software acceleration. If the comparison identifies a match, then the Operating system will directly (or through a power management driver) increase the speed of the CPU. Thus, in this software implementation, the input device driver discriminates system command inputs from simple data inputs, and directs the power management software directly.

The Windows Operating system currently identifies system commands, and thus a link between the Operating system and the power management system may be established to implement the CPU acceleration upon detection of a system command. The Operating system driver identifies system commands, such as mouse clicks and function key selection. These inputs are referred to in the Windows Operating system as "keyboard accelerators", and will directly call the initiation of a routine or child window to a parent application. One example performs static functions of the Operating System, such as switching the active focus from program to program by selecting the Alt-tab key combination. Another example is dynamic functions from open applications, such as pressing the Alt-V key combination to enable the view menu in Microsoft Word, or pressing F1 to initiate the help menu for the active program. In this instance, the application will message the keystrokes that are appropriate for its menus.

When the Operating system identifies that a pressed key is in its static accelerator list, it will message a WM SYSCOMMAND message. If the keystroke is in the open application accelerator list, the Operating system will message a WM COMMAND to the application. If a menu is active and then user presses a keystroke that is not on the Accelerator list, a WM MENUCHAR message is sent to the application. Mouse clicks are also messaged to the application or used directly by the Operating system. Typical messages are WM NCLBUTTONDOWN for a left mouse button click, and WM NCLBUTTONDBLCLK for a double-click of the mouse button.

Because the Operating system already identifies system command keys, the input driver may be modified according to the present invention to direct the power management of the system. Upon recognition of a System command keystroke by the input driver, an event may be sent to the power management software. The power management software selects the fastest CPU speed by actuating the speed switch so the CPU operates at its highest frequency.

As another alternative, the system BIOS could be used to identify system command inputs from the user. As noted above, the keyboard controller generates make codes to the keyboard controller, which translates the make codes to scan codes. The keyboard controller then generates a system hardware interrupt request (IRQ1 For the PC/AT keyboard) when the keyboard buffer is becoming full. The system BIOS responds to the interrupt request (IRQ1) and reads the scan codes from the keyboard controller buffer. The Operating system or application then calls the system BIOS through a software interrupt call (INT 9 or INT16) to retrieve the recent scan codes. This sequence could be altered, according to an alternative embodiment, to allow the system BIOS call (the IRQ1 hardware routine, or the INT9 or INT16) to compare the scan code with a list of system command inputs to determine if the user has initiated a system command event.

Referring again to FIG. 1, the USB bus 148 supports various peripherals, especially video peripherals such as video cameras for teleconferencing purposes. Moreover, it should be understood that the mouse and/or keyboard may be coupled via the USB bus 148 to the South bridge logic 168. In that event, the operating system or system BIOS may be used to distinguish system commands from data inputs, as described above. In addition to the buses discussed above, the South bridge 168 also preferably connects to interrupt signal lines and power management signal lines Referring still to FIG. 1, the CPU 112 preferably is capable of operating at multiple frequencies. Two such frequencies are depicted in FIG. 1 for purposes of illustration, labeled "Fast" and "Slow". According to the preferred embodiment, two different clock signals are provided, either from separate oscillators, or from the same oscillator using some form of frequency division or multiplication. Although two clock frequencies are depicted in FIG. 1, more than two frequencies may be provided. As shown in FIG. 1, a frequency multiplexer 190 selects the clock signal that will be applied to the CPU based on a control input signal that is generated by the speed control algorithm 185 running on the CPU or some other device capable of executing software routines. In similar fashion, a plurality of voltage signal levels may be applied to the CPU 112 to operate the CPU. A voltage multiplexer 195 preferably selects the voltage signal to apply to the CPU 112 based on a control signal from the speed control algorithm 185, or some other circuitry. As one skilled in the art will appreciate, circuitry other than multiplexes 190, 195 may be used to select the appropriate frequency and voltage to apply to the CPU 112.

The speed control algorithm preferably forms part of the BIOS or the operating system software, which may be stored in the BIOS ROM 144 or some other read only memory device. The speed control algorithm 185 preferably loads in response to receipt of the SMI from the Keyboard controller 160 to implement acceleration of the CPU clock speed in accordance with the principles of the present invention. Alternatively, the speed control algorithm may be called by the Operating system or the system BIOS in response to a determination that a system command input has been received.

In response to the receipt of the SMI from the Keyboard controller 160, or as directed by the Operating system or system BIOS, the speed control algorithm 185 is activated by the CPU 112. The speed control algorithm 185 preferably instructs the CPU 112 to generate a control output to the frequency multiplexer 190, preferably causing the frequency multiplexer to select the fast (or highest speed) clock signal, as the clock input to the CPU 112. If more than two clock signals are provided, the speed control algorithm may provide further control to select the appropriate clock speed, based on the user inputs. The CPU clock speed may be returned to the slower speed after the expiration of a predetermined time period, or after the CPU enters an idle mode in response to an Autohalt or Stopclock signal.

According to the preferred embodiment, the speed control algorithm 185 also may control the voltage level to the CPU 112 by proving a control signal to the voltage multiplexer 195 that selects the appropriate voltage level. Alternatively, if voltage control is provided, it may be implemented as a hardware solution that adjusts the voltage levels based on the clock frequency.

Figure 2:
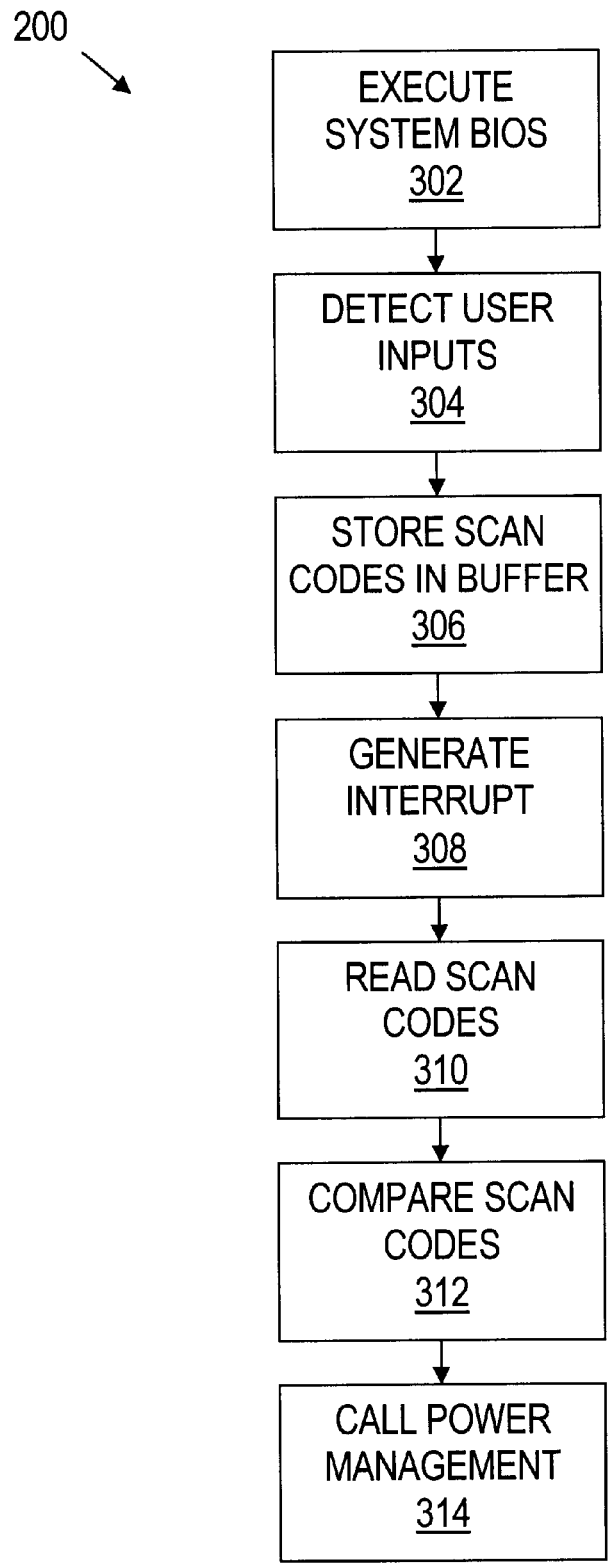
FIG. 2 shows a procedure for accelerating the speed of the CPU of FIG. 1 in accordance with embodiments of the invention.

FIG. 2 shows a procedure 200 for accelerating the speed of a CPU 112 in accordance with embodiments of the inventions. The procedure 200 begins by the CPU 112 executing the system BIOS 144. The keyboard controller 160 detects user inputs to the system 100 (block 304), and the scan codes associated with the detected user inputs may be stored (block 306) in a buffer 165 (FIG. 1). When the buffer 165 is becoming full, the keyboard controller 160 generates an interrupt (block 308), and the system BIOS 144 reads the scan codes stored in the buffer 165 (block 310). The system BIOS 144 compares the scan codes with a list of inputs that indicate a system command (block 312), and if a match is detected, calls power management software (block 314) to accelerate the CPU 112.

The present invention may be varied in several respects to adjust the CPU clock speed based on predicting the need for increased performance. In addition to detecting specific input commands, the speed control algorithm may be designed as an adaptive algorithm that associates user inputs and other system signals with system commands. Thus, for example, if a particular software application has specific keystrokes that result in the generation of a system command signal, the speed control algorithm may thereafter associate this keystroke combination with a system command, and thus may accelerate the CPU clock speed in response to these keystrokes.

The present invention may also be adapted to work with burst events. As noted in the Background, burst events are used as a power management technique to wake the system from a Halt or Stopclock mode in response to a particular event, and then to return the system to the idle condition after a specific time period. The speed control algorithm 185 of the present invention may disable the burst mode so that the system is not returned to the idle mode. Alternatively, the speed control algorithm 185 may modify the preset time of the burst so that the CPU has a longer period to respond to the user commands.

The present invention may be used for other devices other than the CPU. For example, the principles of the present invention may also be applied to a graphics processor, or to other processors in the computer system. Any device in the computer system that can operate at multiple clock speeds may benefit from the principles outlined herein, including busses, peripheral devices, and bridge devices.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method for accelerating the speed of a CPU, comprising:
    detecting user inputs;
    comparing any user inputs to a list of inputs that indicate a system command;
    accelerating the speed of the CPU if a user input indicates a system command; and
    performing an operation associated with the system command, wherein the operation does not comprise changing the speed of the CPU nor causing the speed of the CPU to be changed.

2. The method of claim 1, wherein a Keyboard controller detects the user inputs.

3. The method of claim 2, wherein the user input comprises a keyboard that generates a make code signal to the keyboard controller when a key is pressed, and which generates a break code signal when the key is lifted.

4. The method of claim 3, wherein the keyboard controller identifies the make code and translates it to a scan code.

5. The method of claim 4, wherein the Keyboard controller compares the make code with the list of inputs that indicate a system command.

6. The method of claim 5, wherein the Keyboard controller asserts a system management interrupt to the CPU if the make code matches an entry in the list of inputs that indicate a system command, and in response, power management software is called that accelerates the speed of the CPU.

7. The method of claim 4, wherein the Keyboard controller includes a buffer for storing scan codes, and the Keyboard controller generates a system hardware interrupt when the buffer is becoming full.

8. The method of claim 7, wherein the CPU executes a system BIOS, and the system BIOS responds to the system hardware interrupt by reading the scan codes from the buffer.

9. The method of claim 8, wherein the system BIOS compares the scan code with the list of inputs that indicates a system command.

10. The method of claim 9, wherein the system CPU executes a system BIOS, and the system BIOS responds to the system hardware interrupt by reading the scan codes from the buffer.

11. The method of claim 10, wherein the system BIOS calls power management software if an entry in the scan code matches one of the entries in the list of inputs that indicate a system command.

12. The method of claim 8, wherein the system BIOS responds to a software interrupt call to retrieve the scan codes.

13. The method of claim 12, wherein the system BIOS compares the scan code with the list of inputs that indicates a system command.

14. The method of claim 13, wherein the system BIOS calls power management software if an entry in the scan code matches one of the entries in the list of inputs that indicate a system command.

15. The method of claim 2, wherein the user input comprises a pointing device that periodically transmits a packet of information to the Keyboard controller identifying position and whether a button has been depressed on the pointing device.

16. The method of claim 15, wherein the Keyboard controller examines the packet to determine if a button has been depressed on the pointing device.

17. The method of claim 16, wherein the Keyboard controller determines if the button on the pointing device has been double-clicked.

18. The method of claim 17, wherein the Keyboard controller transmits a system management interrupt to the CPU if a button on the pointing device has been double-clicked, and in response, power management software is called that accelerates the speed of the CPU.

19. The method of claim 1, wherein the user inputs are detected by the Operating system.

20. The method of claim 19, wherein the list of inputs identifies keystrokes that represent system commands.

21. The method of claim 20, wherein the Operating system identifies activation of system command keys by the user, and in response, calls power management software to increase the speed of the CPU.

22. The method of claim 1, wherein the CPU continues low speed operation if a system command is not detected.

23. A computer system, comprising:
 a CPU capable of operating at two different clock speeds;
 a multiplexer that selects the clock speed at which the CPU operates;
 a Keyboard controller coupled to said CPU;
 at least one user input device coupled to said Keyboard controller;
 wherein said Keyboard controller detects input signals from said user input device that indicate a system command, and in response generates a system management interrupt to said CPU; and
 wherein said CPU, in response to said system management interrupt, provides a control input to said multiplexer to accelerate the clock speed at which the CPU operates and performs an operation associated with the system command, wherein the operation does not comprise changing the clock speed of the CPU nor causing the speed of the CPU to be changed.

24. The system of claim 23, wherein the user input device comprises a mouse, and said Keyboard controller generates the system management interrupt in response to a mouse click.

25. The system of claim 23, wherein the user input device comprises a keyboard.

26. The system of claim 25, wherein the Keyboard controller generates the system management interrupt in response to a depression of a predetermined system command keystroke by the user.

27. The system of claim 23, wherein the CPU calls a speed control algorithm in response to the system management interrupt.

28. The system of claim 23, wherein the Keyboard controller couples to a South bridge, and said South bridge generates a Stopclock signal to said CPU to turn off the clock input to said CPU.

29. The system of claim 23, wherein the two clock speeds are fast and slow, and further comprising a voltage control circuit that supplies power to said CPU at a selected voltage level, and wherein the voltage level to the CPU varies depending on whether the CPU is operating at a fast clock speed or a low clock speed.

30. A method of accelerating or maintaining the clock speed of a CPU at its highest speed, comprising the acts of:
 detecting user inputs;
 analyzing the user inputs to identify a system command;
 operating the CPU at its highest clock speed in response to receipt of the system command; and
 performing an operation associated with the system command, wherein the operation does not comprise changing the clock speed of the CPU nor causing the speed of the CPU to be changed.

31. The method of claim 30, further comprising the act of generating a system management interrupt to the CPU indicating a system command has been received.

32. The method of claim 30, wherein the clock speed of the CPU is maintained at its fastest speed in response to receipt of a system command within a predetermined time period.

33. The method of claim 30, wherein the act of analyzing the user inputs to identify a system command includes identifying a mouse double-click and interpreting that user input as a system command.

34. The method of claim 30, wherein the act of analyzing the user inputs to identify a system command includes identifying a predetermined keystroke combination.

35. The method of claim 19, wherein the act of analyzing the user inputs to identify a system command includes identifying selection of an Alt key in combination with another key as a system command.

36. The method of claim 30, wherein the act of operating the CPU at its highest clock speed occurs as an extended burst event.

37. A method of accelerating the clock speed of a processor, comprising the acts of:

detecting user inputs;

analyzing the user inputs to identify a system command;

generating an interrupt to a CPU indicating a system command has been received; and increasing the clock speed of the processor in response to receipt of the system command; and performing an operation associated with the system command, wherein the operation does not comprise changing the clock speed of the processor nor causing the speed of the CPU to be changed.

38. The method of claim 37, wherein the interrupt comprises a system management interrupt.

39. The method of claim 37, wherein the clock speed of the processor is increased to its fastest speed in response to receipt of a system command.

40. The method of claim 37, wherein the act of analyzing the user inputs to identify a system command includes identifying a mouse click within a particular application and interpreting that user input as a system command.

41. The method of claim 37, wherein the act of analyzing the user inputs to identify a system command includes identifying a selection of an Enter key and interpreting that input as a system command.

42. The method of claim 37, wherein the act of analyzing the user inputs to identify a system command includes identifying a selection of a Page Up or Page Down key and interpreting those inputs as a system command.

43. The method of claim 37, wherein the act of analyzing the user inputs to identify a system command includes identifying a selection of a special function key and interpreting that input as a system command.

44. The method of claim 37, wherein the act of analyzing the user inputs to identify a system command includes identifying a selection of an Alt key in combination with another key as a system command.

45. The method of claim 37, wherein the processor comprises the CPU.

\* \* \* \* \*